(12) United States Patent
Raghavan et al.

(10) Patent No.: US 11,861,882 B2
(45) Date of Patent: Jan. 2, 2024

(54) SYSTEMS AND METHODS FOR AUTOMATED PRODUCT CLASSIFICATION

(71) Applicant: SHOPIFY INC., Ottawa (CA)

(72) Inventors: Kshetrajna Raghavan, Fremont, CA (US); Kyle Bruce Tate, Ottawa (CA); Peng Yu, Montreal (CA); Niklas Itänen, Ottawa (CA); Xiaoxiao Li, Oakville (CA)

(73) Assignee: SHOPIFY INC., Ottawa (CA)

( * ) Notice: Subject to any disclaimer, the term of this patent is extended or adjusted under 35 U.S.C. 154(b) by 129 days.

(21) Appl. No.: 17/554,474

(22) Filed: Dec. 17, 2021

(65) Prior Publication Data

US 2023/0196741 A1   Jun. 22, 2023

(51) Int. Cl.
*G06V 10/774* (2022.01)
*G06V 10/762* (2022.01)
*G06V 10/776* (2022.01)

(52) U.S. Cl.
CPC ...... *G06V 10/7747* (2022.01); *G06V 10/7635* (2022.01); *G06V 10/776* (2022.01)

(58) Field of Classification Search
CPC ........... G06V 10/7747; G06V 10/7635; G06V 10/776
See application file for complete search history.

(56) References Cited

U.S. PATENT DOCUMENTS

2021/0110457 A1* 4/2021 Polanía Cabrera .... G06V 20/00

OTHER PUBLICATIONS

Wen et al, Meta-Inductive Node Classification across Graphs, 2021, Mining and Classification, SIGIR '21, 1219-1228. (Year: 2021).*
Liu et al, Item Relationship Graph Neural Networks for E-Commerce, 2021, IEEE Transactions on Neural Networks and Learning Systems, 1-15. (Year: 2021).*
Li et al, Hierarchical Bipartite Graph Neural Networks: Towards Large-Scale E-commerce Applications, 2020, IEEE International Conference on Data Engineering, 1677-1688. (Year: 2020).*

* cited by examiner

*Primary Examiner* — John Villecco
*Assistant Examiner* — Kathleen M Broughton

(57) ABSTRACT

A data partitioning system receives an input dataset for e-commerce products, each sample containing attributes and associated values for each product including at least an image; represents each sample as a node on a graph to provide a graph of nodes for the dataset; measures a relative similarity distance between each pair of nodes based on comparing at least image values for the attributes; determines for each pair of nodes whether they are related if the similarity distance between them is below a defined threshold, and if related, generate an edge between them on the graph; group the connected nodes into a first or a second group such that the grouped nodes have no edges connecting them to nodes in the other group and have a shortest relative similarity distance with each other. The groups are used as training dataset and testing data sets for a supervised machine learning classifier.

20 Claims, 8 Drawing Sheets

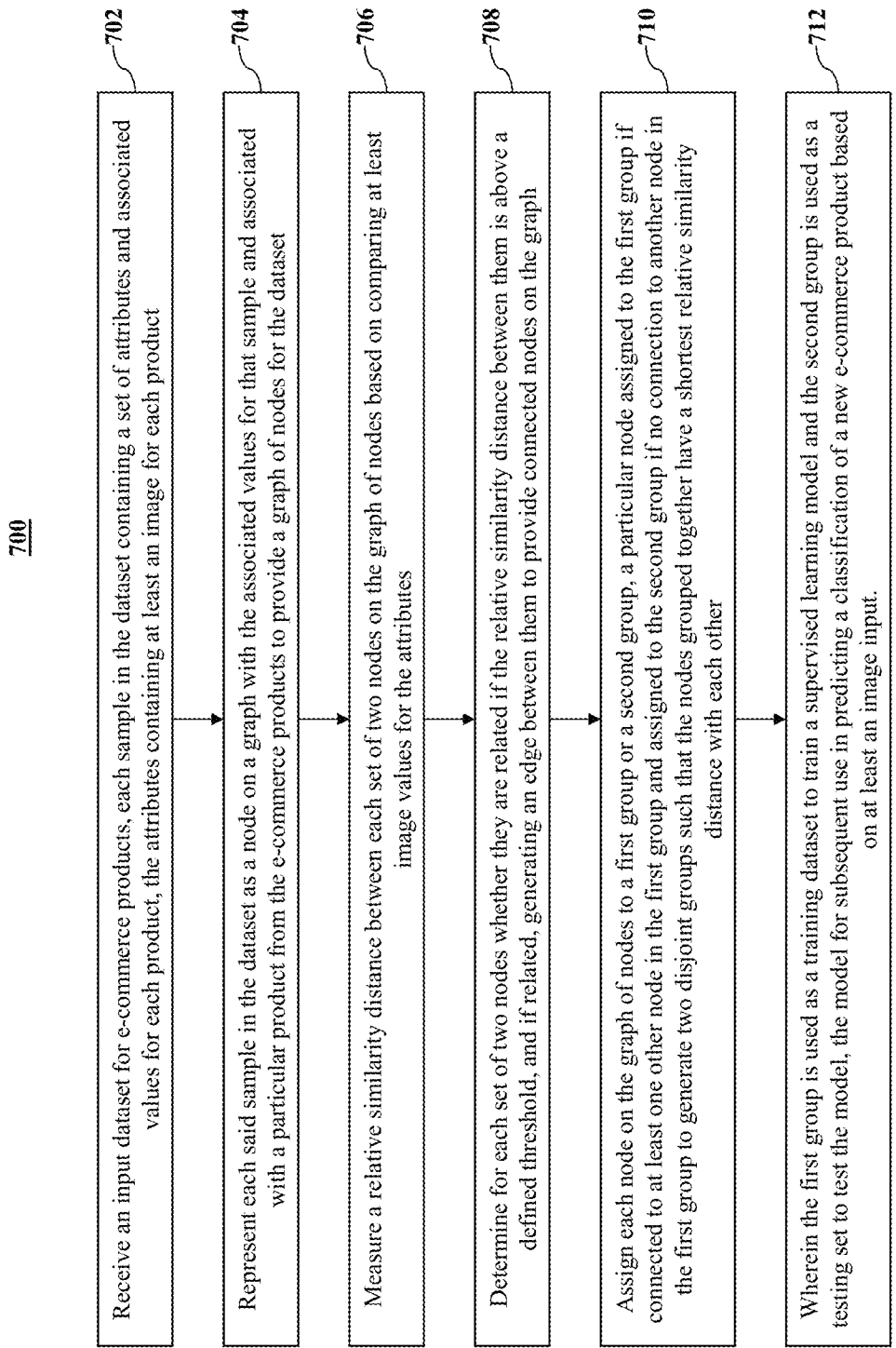

SYSTEMS AND METHODS FOR AUTOMATED PRODUCT CLASSIFICATION

FIELD

The present application relates to systems and methods for automated product classification using a supervised classifier model and more particularly to intelligent partitioning of data for generating the model.

BACKGROUND

The classification of data into predetermined categories can help users quickly understand and filter through large amounts of data. While a machine learning model that automatically classifies data can help streamline the time consuming process associated with manual classification, the performance and accuracy of such a model will largely depend on the datasets used for building the model. For example, the performance of the model will depend on the training data set used and the testing data set (e.g. the dataset held back from training the model) is used to assess accuracy and performance of the model and provide an estimated measurement of such performance.

Typically, an initial model may be trained and fit on a training dataset using a supervised learning method. The training dataset often includes a set of inputs and a corresponding set of outputs expected from the model. That is, a model is run with the training dataset and the output results are compared to the expected output for each input in the training dataset. These comparisons are used to tweak the model parameters (e.g. weights, algorithms, etc.) to better predict the correct output for a given input. A model exiting the training phase (once all tweaks are complete) is referred to as a trained model. Subsequently a test data set is used only to assess a performance of a trained model that has already been fit on the training dataset.

Generally, the training and testing of a classification machine learning model involves randomly splitting a sample dataset into a training subset and a testing subset. However, such random splitting of data sets for the model build can result in the lack of generalization or overfitting of the model by virtue of identical or highly similar components/features being shared between the training dataset and the testing dataset such that the model classifies a given input component or feature based on how that component or feature was classified during training. For example, a classification model that has been trained using a specific photo of an iPhone™ 11 as being in the "mobile device" category learns to classify a product listing having that specific photo in the "mobile device" category but may subsequently encounter difficulties in categorizing variations of that specific photo (e.g. for other iPhone™ 11 product listings) as being in the same "mobile device" category.

Generally, the performance of the classification model (as measured using the test dataset) may be overestimated as a result of the model relying on its prior direct "memory" from training rather than applying a robust machine learning system of classifying new data that it has adaptively "learned" via a diverse training data set as a result of its training. This reliance on direct "memory" is referred to as memorization and is the model's inability to generalize to unseen data (e.g. perform generalization) but rather relies on memorizing exact inputs and corresponding outputs (e.g. similar to a lookup table). This may result in an overestimation of the accuracy of predictions of classifications for new data as the training data would not have sufficiently trained the model in order to make predictions on the new data. Simply put, such overfit models are unable to handle new or otherwise unseen data and are thus not useful as they lack the generalization ability thereby leading to inaccuracies.

SUMMARY

In at least some implementations, there is provided computer-implemented systems and methods for automated product classifications with improved efficiency and accuracy using optimally and dynamically chosen data sets to build (e.g. train) and assess performance (e.g. test) the product classification models, whereby samples in the dataset are dynamically allocated to training sets or testing sets for optimal results. In some cases, in addition to being assigned to the training set and the testing set, the available data set for building the model may additionally be allocated to other defined data sets for building the model, such as validation sets.

There is thus a need for systems and methods for automated product classification using supervised model(s) that intelligently partitions and allocates data into training and testing sets for the model(s) such as to address or mitigate at least some of the above mentioned disadvantages.

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a computer-implemented method for partitioning data used for generating supervised learning models. The computer—implemented method also includes receiving an input dataset for e-commerce products, each sample in the dataset containing a set of attributes and associated values for each product, the attributes containing at least an image for each product. The method also includes representing each said sample in the dataset as a node on a graph with the associated values for that sample and associated with a particular product from the e-commerce products to provide a graph of nodes for the dataset. The method also includes measuring a relative similarity distance between each set of two nodes on the graph of nodes based on comparing at least image values for the attributes. The method also includes determining for each set of two nodes whether they are related if the relative similarity distance between them is below a defined threshold, and if related, generating an edge between them to provide connected nodes on the graph. The method also includes assigning each node on the graph of nodes to a first group or a second group, a particular node assigned to the first group if connected to at least one other node in the first group and assigned to the second group if no connection to another node in the first group to generate two disjoint groups such that the nodes grouped together have the shortest relative similarity distance with each other; and where the first group is used as a training dataset to train a supervised learning model and the second group is used as a testing set to test the model, the model for subsequent use in predicting a classification of a new e-commerce product based on at least an image input. Other embodiments of this aspect include corresponding computer systems, apparatus, and computer programs recorded on one or more computer storage devices, each configured to perform the actions of the methods.

Implementations may include one or more of the following features. The method may include grouping connected nodes extending between more than two nodes to form a grouped connection thereby the relative similarity distance being calculated between the grouped connection and at least one of: other nodes in the graph of nodes, and other grouped connection of nodes connected together by edges. The nodes once grouped into the grouped connection are related to one another at least by way of characterizing a same e-commerce product; and, measuring the relative similarity distance may include measuring the relative similarity distance between a centroid of each two grouped connections to determine whether to group into the first or the second group. The attributes may include image and text converted to vector values describing the e-commerce products, the attributes may include: product description, product identification, brand identification, financial statistics related to the products, product images, and customer images. Measuring the relative similarity distance between two nodes may include representing each node as a multi-dimensional vector, at least one dimension representing each of the associated attributes containing text and image samples. The similarity distance may be calculated between the multi-dimensional vectors for two nodes using one of: a Euclidean distance, Minkowski distance, Manhattan distance, Hamming distance, and Cosine distance.

In at least some implementations, as described above, the method disclosed applies graph mining on the input e-commerce product dataset and similarity distance calculations on node pairs to identify connected data nodes and thereby generate a graph of two disjoint data set groups (e.g. such that the nodes grouped together have the shortest relative similarity distance with each other). In turn, this allows the two disjoint groups to be used respectively for training and testing the supervised machine learning classifier model. Conveniently, in at least some aspects, without repeated or otherwise similar data across the training and testing data sets, this allows improved generalization of the supervised classifier model and thus yields increased accuracy as the model is not being trained and tested on the same or shared data.

The method may include a third group of nodes having edges connecting them, the third group of nodes having samples selected from the dataset, the third group of nodes being disjoint from both the first and the second group and used as a validation set to validate the classification model. The supervised learning model may be a classification model, may include a neural network for classifying the e-commerce products containing image and text into a set of labelled categories of products by training the classification model based on the training dataset and testing a performance of the classification model using the testing dataset. Measuring the relative similarity distance between two nodes each containing associated image data for the attributes, further may include: performing a hashing conversion to each image data to generate a hash value for each node and calculating a Hamming distance between the hash values as the relative similarity distance, the image data for two nodes being considered similar if the distance is below a defined threshold. Measuring the relative similarity distance between two nodes each containing associated text data for the attributes, further may include converting the text data to a vector including a frequency of each word and calculating a distance between vectors for the text data, the text data for two nodes being considered similar if the distance is below a defined threshold. Implementations of the described techniques may include hardware, a method or process, or computer software on a computer-accessible medium.

In yet another aspect, there is provided a computer readable medium having instructions tangibly stored thereon, wherein the instructions, when executed cause a system to: receive an input dataset for e-commerce products, each sample in the dataset containing a set of attributes and associated values for each product, the attributes containing at least an image for each product; represent each said sample in the dataset as a node on a graph with the associated values for that sample and associated with a particular product from the e-commerce products to provide a graph of nodes for the dataset; measure a relative similarity distance between each set of two nodes on the graph of nodes based on comparing at least image values for the attributes; determine for each set of two nodes whether they are related if the relative similarity distance between them is below a defined threshold, and if related, generate an edge between them to provide connected nodes on the graph; assign each node on the graph of nodes to a first group or a second group, a particular node assigned to the first group if connected to at least one other node in the first group and assigned to the second group if no connection to another node in the first group to generate two disjoint groups such that the nodes grouped together have a shortest relative similarity distance with each other; and, wherein the first group is used as a training dataset to train a supervised learning model and the second group is used as a testing set to test the model, the model for subsequent use in predicting a classification of a new e-commerce product based on at least an image input.

One general aspect includes a computer system for partitioning data used for generating supervised learning models. The computer system also includes a processor in communication with a storage, the processor configured to execute instructions stored on the storage to cause the system to: receive an input dataset for e-commerce products, each sample in the dataset containing a set of attributes and associated values for each product, the attributes containing at least an image for each product. The system also includes representing each said sample in the dataset as a node on a graph with the associated values for that sample and associated with a particular product from the e-commerce products to provide a graph of nodes for the dataset; measure a relative similarity distance between each set of two nodes on the graph of nodes based on comparing at least image values for the attributes; determine for each set of two nodes whether they are related if the relative similarity distance between them is below a defined threshold, and if related, generate an edge between them to provide connected nodes on the graph; assign each node on the graph of nodes to a first group or a second group, a particular node assigned to the first group if connected to at least one other node in the first group and assigned to the second group if no connection to another node in the first group to generate two disjoint groups such that the nodes grouped together have a shortest relative similarity distance with each other; and where the first group is used as a training dataset to train a supervised learning model and the second group is used as a testing set to test the model, the model for subsequent use in predicting a classification of a new e-commerce product based on at least an image input. Other embodiments of this aspect include corresponding computer systems, apparatus, and computer programs recorded on one or more computer storage devices, each configured to perform the actions of the methods.

BRIEF DESCRIPTION OF THE DRAWINGS

Embodiments will be described, by way of example only, with reference to the accompanying figures wherein.

DETAILED DESCRIPTION

One or more currently preferred embodiments have been described by way of example. It will be apparent to persons skilled in the art that a number of variations and modifications can be made without departing from the scope of the invention as defined in the claims.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In at least some embodiments, it would be advantageous to reduce the processing time and save computing resources associated with inefficient and inaccurate classification of e-commerce products resulting from incorrect use of available input data for building the classification model which may be based on manual partitioning or random partitioning of the data resulting in an erroneous classifier. Notably, in some cases, manual partitioning of data between the training and testing data sets is not only inaccurate and yields unpredictable performance results but it is also not a feasible approach when dealing with large datasets with potentially numerous duplicate or similar input data entries (e.g. image or text entries).

Generally, in at least some implementations, there is disclosed herein systems and methods for automated product classifications with improved efficiency and accuracy by intelligently partitioning available source data sets for different purposes (e.g. training/testing/validation) as used to build the supervised machine learning models in the classifiers.

An Example e-Commerce Platform

Figure 1:
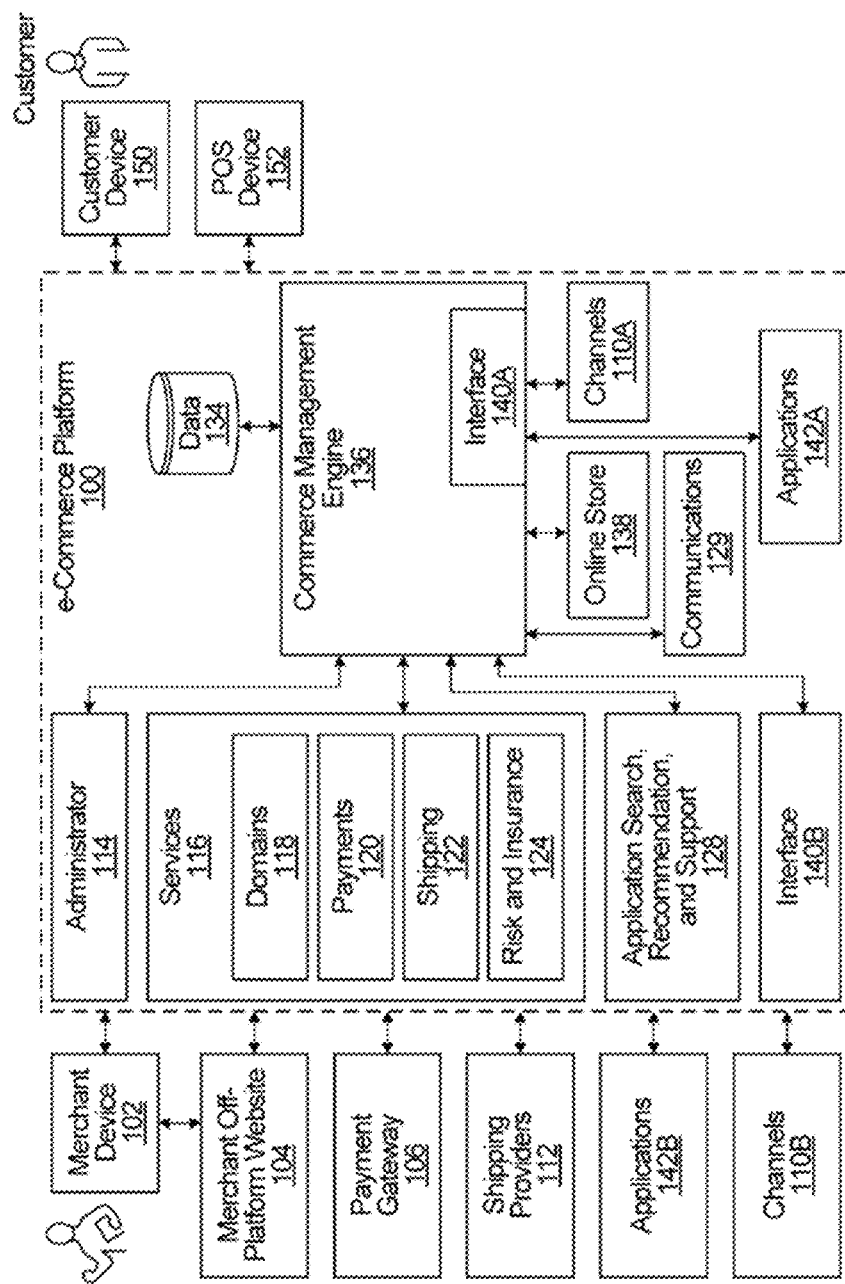
FIG. 1 is a block diagram of an e-commerce platform, according to one embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript™, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings that may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
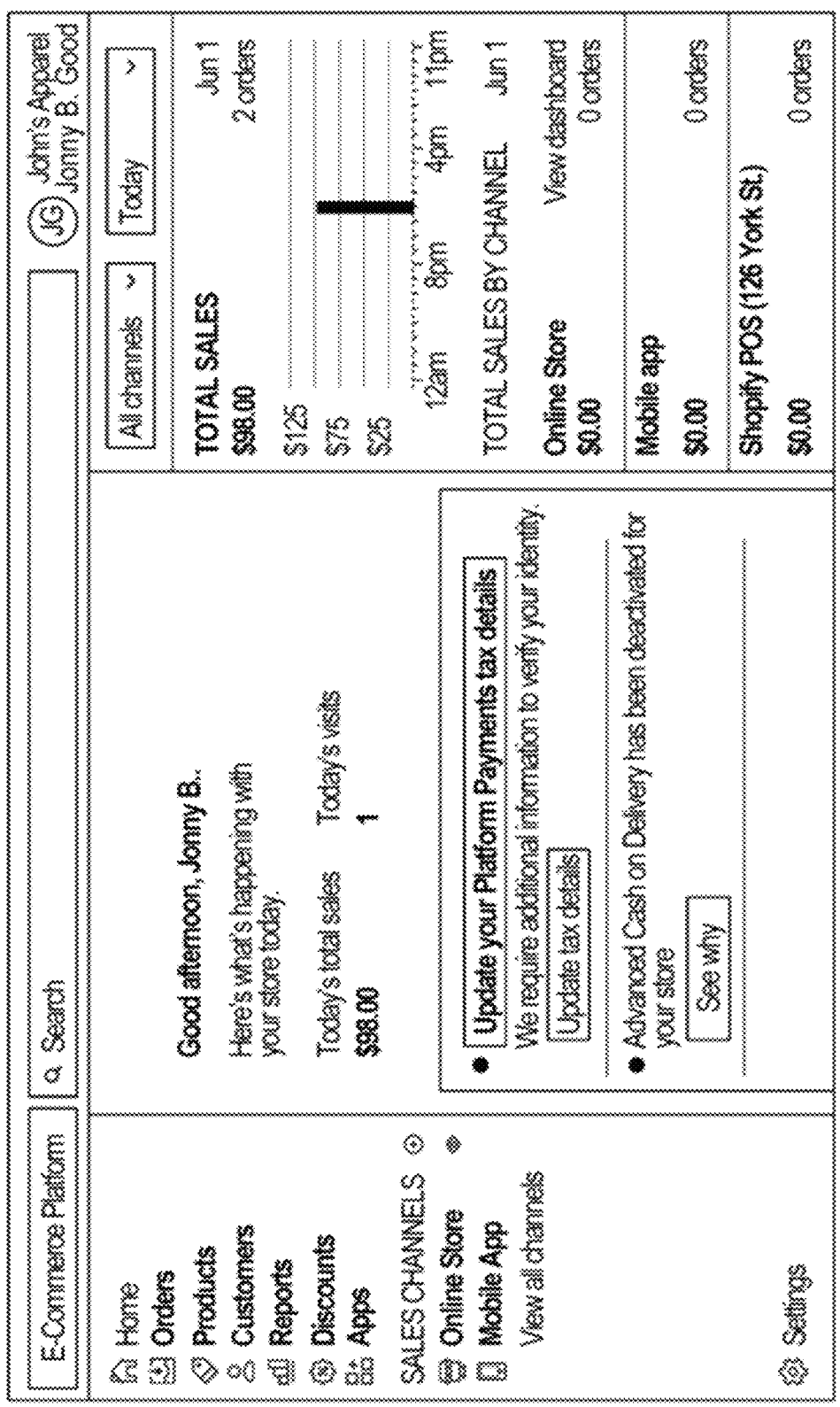
FIG. 2 is an example of a home page of an administrator, according to one embodiment.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant).

Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Engine 300—Data Partitioning and Automated Classification System

Figure 3:
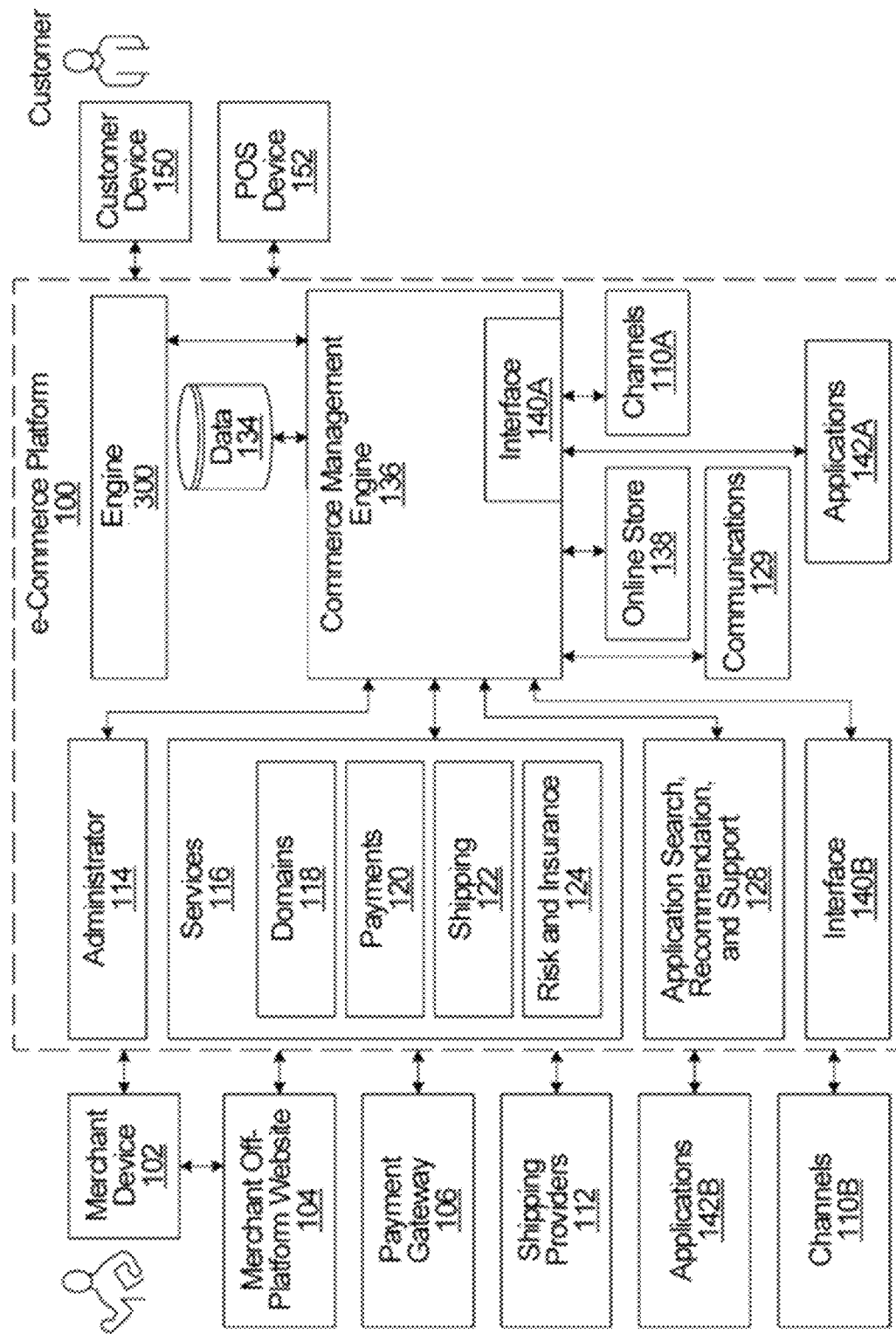
FIG. 3 illustrates the e-commerce platform of FIG. 1 but including an engine for partitioning data for building and/or testing a machine learning model configured for generating classifications of product(s) having image and/or text components, according to one embodiment.

The functionality described herein may be used in e-commerce systems to provide improved customer or buyer experiences. The e-commerce platform 100 could implement the functionality for any of a variety of different applications, examples of which are described elsewhere herein. FIG. 3 illustrates the e-commerce platform 100 of FIG. 1 but including an engine 300. The engine 300 is an example of a computer-implemented classification system and engine that implements the functionality described herein for use by the e-commerce platform 100, the customer device 150 and/or the merchant device 102.

The engine 300, also referred to as a classification engine, utilizes a supervised machine learning model to classify received product data (e.g. images or text related to e-commerce products which may or may not be labelled) so as to associate it with one or more e-commerce products. The engine 300 is configured to optimize such a classifier (e.g. the classifier 416 in FIG. 4) implemented using a supervised machine learning model by intelligently selecting and assigning training and testing data from a pool of available product data (e.g. product attributes) for the model. The classification may be displayed to one or more users interacting via one or more computing devices (e.g. merchant device 102 and/or customer device 150 and/or other native or browser application in communication with platform 100) with the engine 300. In non-limiting examples, the classification predictions may be in the form of a link to product metadata (e.g. websites) and associated attributes classified as belonging to the product.

Although the engine 300 is illustrated as a distinct component of the e-commerce platform 100 in FIG. 3, this is only an example. The engine 300 could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides the aforementioned engine. However, the location of the engine 300 is implementation specific. In some implementations, the engine 300 is provided at least in part by an e-commerce platform (e.g. e-commerce platform 100), either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms and may be implemented in other computing devices.

Each of the data partitioning model 408 and the classifier 416 may be implemented in software and may include instructions, logic rules, machine learning, artificial intelligence or combinations thereof stored on a memory (e.g. stored within data 134 on the e-commerce platform 100 or an external memory accessible by the engine 300) and executed by one or more processors which, as noted above, may be part of or external to the e-commerce platform 100 to provide the functionality described herein.

Figure 4:
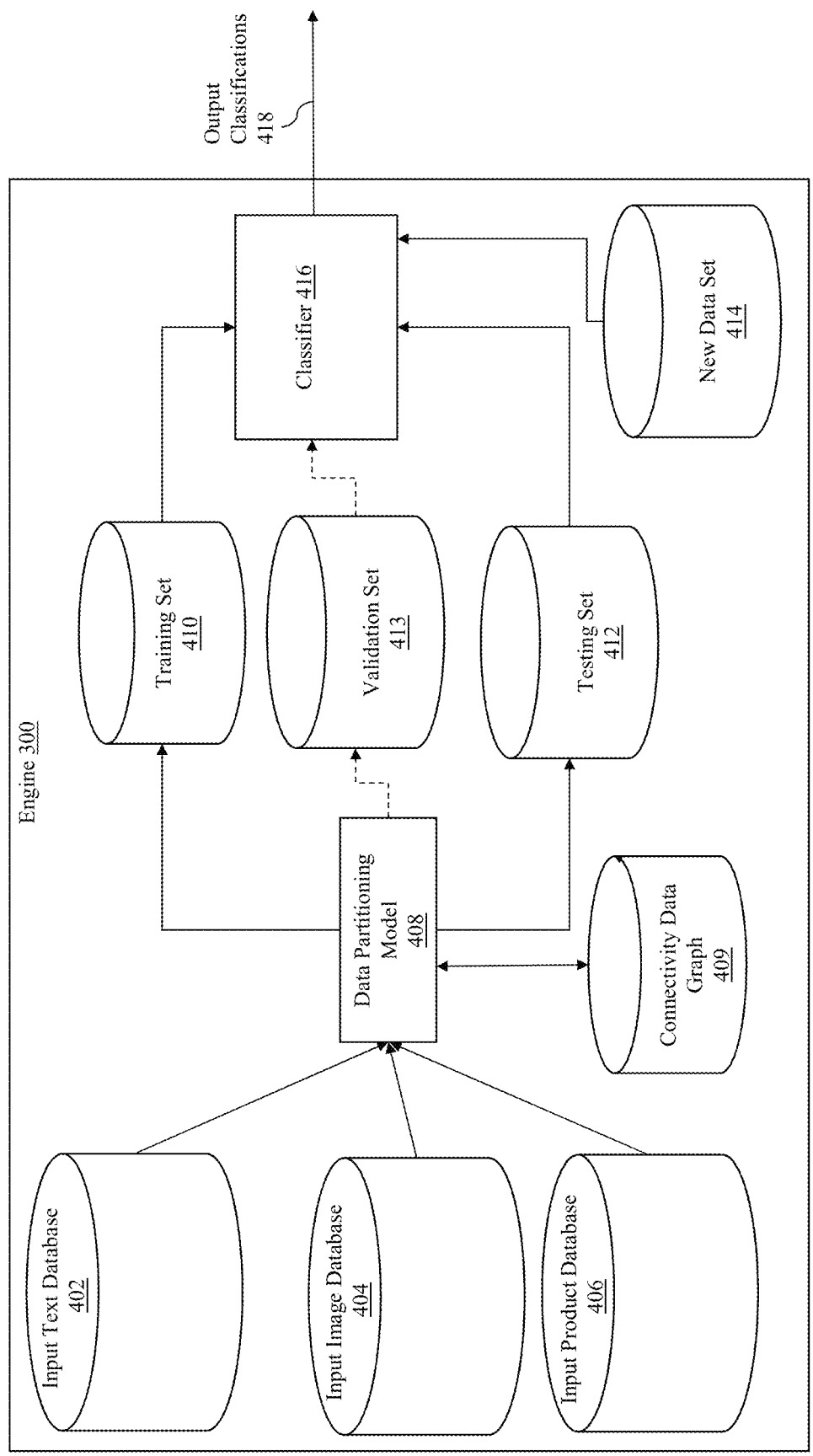
FIG. 4 is one example of the engine of FIG. 3 for separating data into at least a test data set and a training data set for use in generating a trained classification model for classifying products to the entity, according to one embodiment.

Referring to FIG. 4, shown is an example classification engine 300 according to one embodiment, which includes various modules and data stores, for generating optimal data splitting of available data into multiple parts (e.g. testing data set and training data set) for building and testing of supervised classification model(s) used to classify e-commerce products into product categories for use by one or more computing devices. These modules and data stores include a data partitioning model 408, an input text database 402, an input image database 404, an input product database 406, a connectivity data graph 409, a training set 410, a testing set 412, a classifier 416 and optionally in some aspects, a validation set 413.

The engine 300 may include additional computing modules or data stores in various embodiments to provide the implementations described herein. Additional computing modules and data stores may not have been shown in FIG. 4 to avoid undue complexity of the description. For example, a user computing device providing one or more portions of the source data such as the input text database 402, input image database 404 and input product database 406 and the network through which such device communicates with the engine 300 are not shown in FIG. 4.

At a high level, a need for the classification engine 300 may arise in product classification (e.g. using image, text or other data formats) for electronic commerce applications but automated classification of items such as e-commerce products into predetermined categories is a complex problem to solve. Therefore, it is preferable to include large training and testing samples to improve such a classification engine 300 that utilizes a machine learning (ML) based classifier 416.

Although the input data samples used for training and testing such data driven predictive supervised classification models, e.g. the classifier 416, may come from different sources such as independent online merchants, there may still be very similar or identical data, e.g. two drop shippers selling the same product having similar images (from the same supplier) found within the available source data samples and thus it may decrease the classification performance and accuracy to simply randomly split the source data into defined groups such as training, validation or test sets. Notably, because of the similar or identical types of data that may be found in the source data, random splitting of the data may result in overfitting and lack of generalization in the resulting trained model causing a decreased labelling performance in the accuracy of the classification model.

The supervised machine learning model implemented by the classifier 416 may include but is not limited to: a linear classifier, support vector machine (SVM), neural network, decision trees, k-nearest neighbor, and random forest, and others as may be envisaged by a person or persons skilled in the art.

Thus, in at least some aspects, the engine 300 is configured to intelligently split and assign the source data to various data groups for use by the classifier 416 (e.g. input text database 402, input image database 404, input product database 406) such as to reduce likelihood of testing the model with the same data that was used to train the model shown as the classifier 416.

Generally, in this disclosure, the engine 300 illustrated in FIGS. 3 and 4 dynamically partitions a sample input dataset into a training subset and a testing subset, based on the underlying subsets having distinct components or features, for use in the training and testing of a machine learning model to provide automated classifications of products (e.g. image or text). Conveniently, the splitting of a sample dataset to generate a training subset and a testing subset that minimally overlaps in their components or features may help improve the training, testing and overall predictive performance of the classification model (e.g. the classifier 416).

For example, for e-commerce products, both image (e.g. views of product) and text (e.g. description of item such as product ID or ASIN or product title/description) may be collected, as well as assigned label such as product categories (e.g. 'kids' clothing→shoes'; 'kids' clothing→tops'). This collected data may be used for training, validating, and/or testing a classification model. The goal of the classifier 416 may then be that given an input having both image and text portions—e.g. a new image and a text portion describing the product provided as output classifications 418, to classify the input to predict the label. The label also serves to thus categorize the product as belonging to a group of products, such as kid's clothing→tops.

Although the present disclosure provides in at least some aspects, a method of partitioning a given dataset into disjoint training and testing datasets for a supervised machine learning model used for an example application of automated product classification, such methods and systems described herein may also be applied in other applications where there is a need to identify highly similar content within a data set and prevent duplication (i.e. detecting copyright infringement) or detecting that an ecommerce store on the platform may be using content from another without permission. Such implementations may also be envisaged in the present disclosure.

Figure 6:
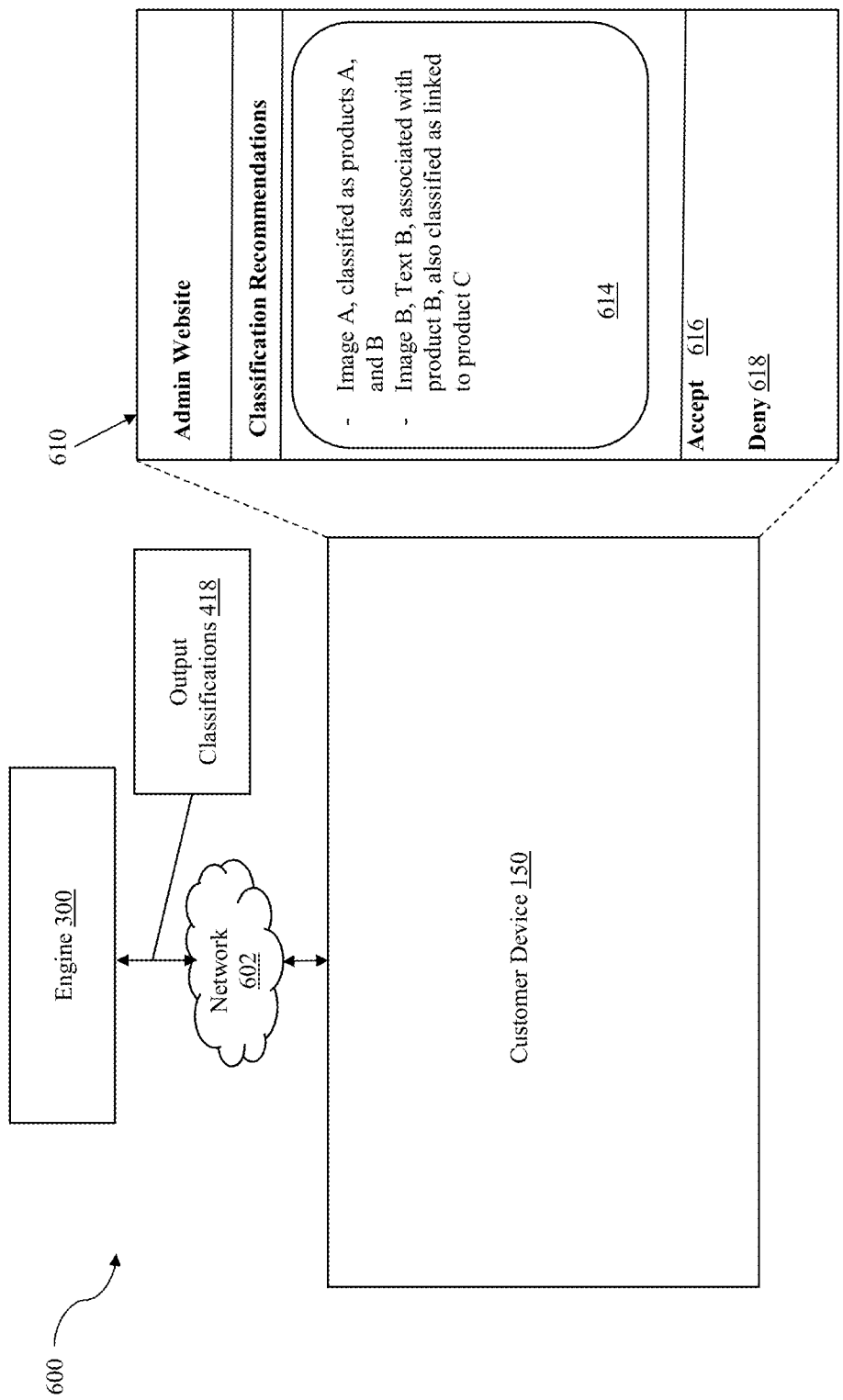

Referring now to FIG. 6, the engine 300 as part of the e-commerce platform 100, may be configured in an example computing system 600 to communicate with one or more other computing devices, including a user computing device (e.g. a customer device 150) across a communication network 602 and instruct the customer device 150 to output the generated product classification as output classification 418 thereon. In the example, the customer device 150 may include a processor, memory and a display configured to display on a screen 610 the classification recommendations. Such classifications of product related feature data (e.g. product text or product image) may be displayed in a first screen portion 614 along with user interface controls to accept 616 or to deny 618 the received classification recommendation. In at least some aspects, once the customer selects one of the options to accept or deny the classification recommendations displayed thereon, such feedback may be provided back to the engine 300 as a parameter to tweak or otherwise improve the classifier 416 and/or data partitioning model 408 based on the received response from the customer device 150.

Referring back to FIG. 4, to prepare the input source data for building the model, e.g., the classifier 416, the data partitioning model 408 operates as a model optimizer which is configured, in at least some embodiments, to provide an improved method for automatically partitioning available input source data (e.g. known data collected from various sources including input text database 402, input image database 404, and input product database 406) into multiple group allocations such as the training, testing and/or validation data thereby to optimize performance of the classification. The training data may be stored in the training set 410, the testing data may be stored in the testing set 412 and the validation data (if provided) may be stored in the validation set 413. The input text database 402 may be configured to store product information in textual format, such as product description, product websites, product information, product reviews, product categorization, product title, associated product names, product compatibility information, merchant information, manufacturer information, shipment information, types of payments acceptable for merchant, and other textual metadata defining e-commerce products as may be envisaged by a person or persons skilled in the art. The input image database 404 may be configured to store one or more digital images of objects associated with e-commerce products, such as views of a merchandise item, associated merchandise items for sale, logo or trademark for a seller or manufacturer, images of packaging, images of use of product in various environments, etc.

The input product database 406 may include digital images and/or text information that is linked to, labelled or otherwise mapped to the associated e-commerce product(s). For example, this may include a textual description and/or digital images for products which includes an identification of one or more products (either a direct identification or link to such information) to which they belong, such as a product identification number or product name that helps customers locate products online.

As may be envisaged, in some embodiments, there may be overlapping content between the information provided in the input text database 402, the input image database 404, and the input product database 406.

Figure 5A:
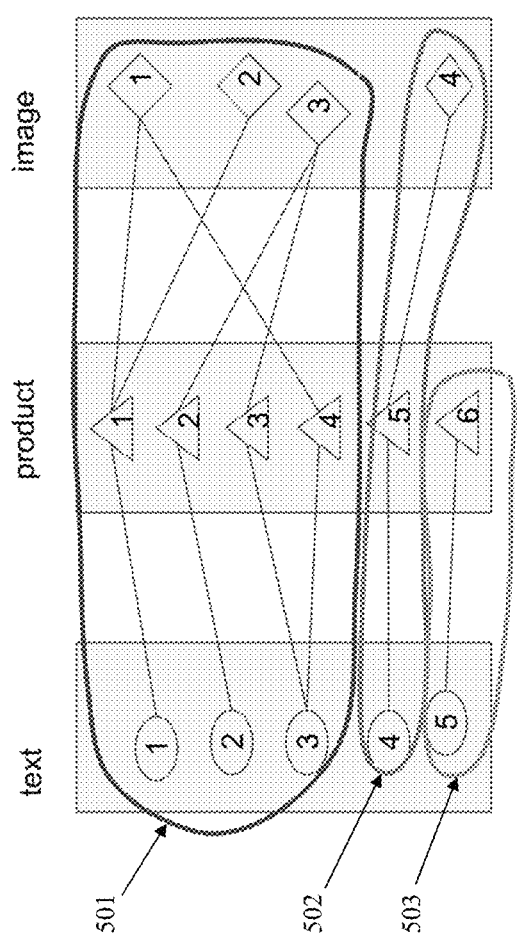
FIGS. 5A and 5B are example block diagrams illustrating the process for automatically partitioning data received at a model into at least training data and testing data, according to one embodiment; and, FIG. 6 shows an example output display of output classifications generated by the trained machine learning model (e.g. classifier) in FIG. 4, according to one embodiment; and, FIG. 7 is a flowchart of a method for dynamically partitioning data for use in generating and testing a supervised machine learning classifier, based on analyzing relationships between the data, according to one embodiment.
Figure 5B:
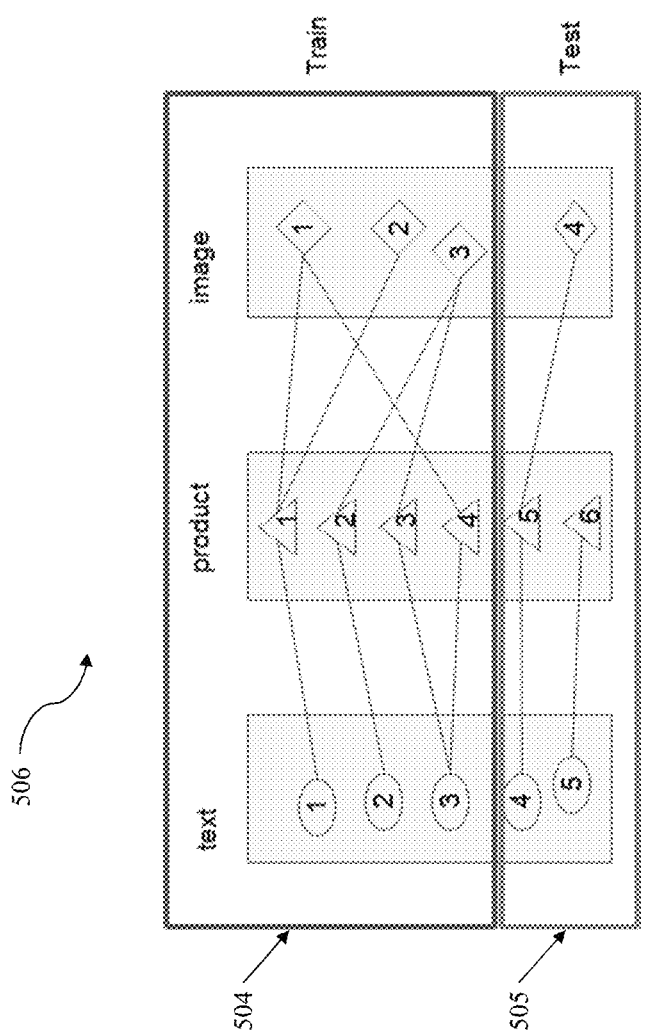

In at least some embodiments, the data partitioning model 408 uses a graph based approach to analyze the source input data for the model as retrieved from the input text database 402, the input image database 404, and the input product database 406, and builds or generates a connectivity data graph 409. In the connectivity data graph 409 (an example of which is shown in FIGS. 5A and 5B), each node represents an attribute of at least one corresponding item or product (e.g. product image and/or product text) and the nodes in the graph are connected by an edge if the data partitioning model 408 considers that they are sufficiently similar to one another. A pair of nodes in the connectivity data graph 409 may be considered sufficiently similar if they are exactly the same or if their distance measurement (e.g. calculated using a Euclidean distance) is below a certain defined threshold.

The comparison of two (or more) samples or data points in a sample input dataset (e.g. any combination of data obtained from input text database 402, input image database 404 and/or input product database 406) may be achieved by using key words, string hashes, patterns, or other types of identifiers to determine the feature value for use in determining a degree of match. The requisite degree of similarity for the co-grouping of data points may be based on a minimum similarity score and/or an identical match.

For example, as shown in FIG. 5A, the text data in a text sample 1, may be compared to textual data in the product sample 1 (e.g. containing a combination of text and/or image data linked to the product) and the images in the image sample 1 is compared to the images in the product sample 1. Based on the similarity of the textual content in the nodes indicating similar text (or a degree of likeness), an edge is drawn between text sample 1 and the product sample 1 and on the other hand, based on the similarity of digital image content in the nodes indicating similar images (or a degree of likeness), an edge is drawn between the product sample 1 and the image sample 1, in the example embodiment of FIG. 5A.

Once the similar nodes are linked via edges, the data partitioning model 408 may define groups of linked nodes (e.g. a first group 501, a second group 502 and a third group 503) and the underlying data for each defined group (which is disjoint relative to other groups) assigned to one of the training/testing/validation data sets for the classification model as shown in the training set 410, the testing set 412 and the validation set 413. An example of the process performed by the data partitioning model 408 of determining connected components or nodes is shown in FIG. 5A and assigning each set of connected components (e.g. forming a cluster) to different data sets (e.g. a first training set 504 and a first testing set 505) is shown at FIG. 5B.

More specifically and referring to FIGS. 4, and 5A-5B, the data partitioning model 408 applies graph mining to the collected source data sets of product images retrieved from the input image database 404, product text data retrieved from the input text database 402 and product data retrieved from the input product database 406 to generate connectivity data graph 409 such that each node in the generated graph relates to an input data sample having at least one attribute or feature component describing a product feature (i.e. each product attribute may include images illustrating views of the product; text description, text title, product price, product identification, etc.). The values for the features in respective input data samples (e.g. actual text for the feature relating to the text description) are used to determine a degree of similarity between them. Additionally, the data partitioning model 408 is configured, to determine whether there is more than a defined degree of similarity or likeness between each pair of nodes and to generate and visualize a link (or edge) between the pair of nodes in the connectivity data graph 409 if the criteria is satisfied.

The connectivity data graph 409, may be represented as G=(U, V, E), where V is a set whose elements are the vertices (or nodes), E is the set of paired vertices whose elements are referred to as edges (or links). U represents the cluster to which the graph belongs to and thus in the below equation, U1 and U2 represent subsets of the initial graph G. Thus the endpoints of an edge may be defined by a pair of vertices. In the current example, the graph is split into two partitions, e.g. two graphs, G1=(U1, V1, E1) and G2=(U2, V2, E2), such that no edges cross the partitions. Put another way, for all u1∈U1, v2∈V2, (u1, v2)∉E and for all u2∈U2, v1∈V2, (u1 v1)∉E.

In at least some aspects, the graph based approach to classifying and assigning the input data sets into subgroups of testing and training data sets (and if applicable validation data sets), an example of which is shown in FIG. 5B, is conveniently advantageous as it allows for an expressive way of visualizing and connecting relationships between the features in the data samples and thus provides an improved classification accuracy.

For example, a first node (e.g. text sample 1) on the connectivity data graph 409 corresponding to an input data sample having text and/or image values describing a particular feature or attribute of the product (e.g. image(s) of the product) is chosen to measure a degree of the connectivity or similarity between the individual data points in a sample input dataset. A graph mining algorithm performed by the data partitioning model 408 processes the dataset such that each of the individual data samples in the input dataset (corresponding to other nodes in the connectivity data graph 409) is assigned a distance vector or score of similarity to the first node's chosen features (e.g. how similar is another node's product image to the first node). That is, a comparison is made between the first nodes' features to each of the other nodes' features in a similar dimension (e.g. compare text to text; image to image) via distance measurement to determine a similarity score for each of the other nodes in the connectivity data graph 409 relative to the first node. If sufficient similarity exists, the similar nodes are connected using an edge between them to form a graph of node components showing the connectivity, an example of which is shown in FIG. 5A. This process is repeated for each of the nodes in the graph to determine the similarity with other nodes to determine connected components/nodes.

Thus, an initial step performed by the data partitioning model 408 is identification of connected components. This may occur by using a flooding algorithm whereby an arbitrary node is chosen and iterated by adding its neighbours to a working notion of the component and so on for their neighbours etc. up until they reach some stopping condition (e.g. max iterations).

By way of further example such operation as performed by the data partitioning model 408 to search and identify connected components within a set of product related nodes may include: a first particular node broadcasting a similarity query to its immediate neighbour nodes (e.g. neighbours being one hop away). For each of the one hop neighbours to the first particular node, if it is determined in response to the query, that there is a desired degree of similarity between such pair of nodes, such as by calculating a similarity distance between them as described herein (e.g. two nodes sharing a common product image or sharing common text describing a product), then an edge is drawn between the first particular node and each of the identified similar nodes one hop away. Each of the neighbour nodes one hop away from the first particular node, which may be referred to as secondary nodes, are then configured to broadcast another similarity query respectively to nodes one hop away from the secondary nodes (e.g. may be referred to as tertiary nodes) but excluding nodes previously queried (e.g. excluding the first particular node). Similar to the prior iteration, if the similarity query reveals more than the defined degree of similarity between a pair of secondary and tertiary nodes (e.g. commonality between text and/or image features of the product), then an edge is drawn between the similar node pairs. This process may be repeated in a similar manner, until a defined completion threshold is triggered such as but not limited to: a set number of iterations is reached, a desired number of connected node components located, or a defined number of nodes queried, etc. An example implementation of such similarity query flooding operation is further discussed with reference to operation 700 in FIG. 7 and more particularly with reference to step 708 of FIG. 7.

Once the entire sample dataset is graphed, the graph mining algorithm will assign each data point to one of two groups—one as the training subset and the other as the testing subset. In other cases more than two groups of data may be desired for building the classifier 416 (e.g. a validation subset in addition to the training and the testing subset). Each data point in the sample input data set can only be assigned to one group, and each group is discrete.

In some cases, after building an initial graph and identifying its connected components in the connectivity data graph 409, there may still be a need for the data partitioning model 408 to group connected components initially assigned to different groups (e.g. if there are more than two sets of connected components) with other connected components to form training/test data sets of sufficient size and characteristics.

FIG. 5A, shows an example initial graph of connected nodes which have been partitioned into a first group 501, a second group 502 and a third group 503 based on determining groups of directly connected components. In the example illustrated in FIG. 5A, there is no edge between the nodes (and thus not sufficient direct similarity between pair of nodes) in the second group 502 and each of the connected node components in the first group 501 or the third group 503. However, given that in the current example, it may be desirable to have a testing data set of a certain size that is not met by any one of the groups, then it may be desirable to combine the second group 502 with the first group 501 to reach a first training set 504 that is of a desirable size. The size of each subset contained in a group or cluster can be configured (e.g. adapted based on model performance). Preferably, in at least some aspects, the training subset represents a larger proportion of the total size of the sample dataset than the testing subset.

In other aspects, although the testing and training data set sizes may not have been identified, it may be defined, in one example, that one goal of the data partitioning model 408 is to generate two distinct groups—e.g. one for the training dataset (e.g. training set 410) and another for the testing dataset (testing set 412). In this scenario and referring to the example initial grouping in FIG. 5A, other methods may be applied to determine how to combine the three groups into two for the training set 410 and the testing set 412. In one implementation, a clustering technique may be applied to further group the data sets of connected components from the initial graph shown in FIG. 5A into the defined number of groups.

Notably, a clustering technique may be applied to group the connected components in the first group 501, the second group 502 and the third group 503 into the desired two groups. This may be performed by the data partitioning model 408 computing the centroid of each cluster or group after determining the set of connected components (e.g. as shown in FIG. 5A). Thus, in the example of FIG. 5A, this process may include computing the centroid of each of the first group 501, the second group 502 and the third group 503. Once computed, a distance measure may be calculated between each pair of centroids, to determine how to reduce the groupings. Thus, one or more of the groups may be re-assigned to its next closest centroid. In the case of FIG. 5A, the second group 502 is re-assigned to the first group 501 as having a closer centroid measurement between the respective groups as compared to the centroid measurement between the second group 502 and the first group 501. This process may be repeated until the desired number of groups is reached. The resulting example graph 506, being an example of the connectivity data graph 409, is shown in FIG. 5B, having a first revised group, a first training set 504 and a second revised group, a first testing set 505 corresponding to data in the training set 410 and the testing set 412 is generated by the data partitioning model 408.

The grouping of the data points is determined primarily on the basis of ensuring that clusters or groups of data points (i.e. data that are identical, highly similar or otherwise connected to each other by relationships in at least one chosen component/feature) are co-segregated into the same group. For example, two product listings that feature the same image of an iPhone™ 11 would be grouped together either in the training subset (e.g. the first training set 504) or the testing subset (e.g. the first testing set 505), but not separated into the two different groups. The same would apply for two product listings that feature the exact same product description. In this way, the two data groups for the training/testing are ensured to be mutually exclusive of each other along the chosen component(s)/feature(s). In other words, the resulting training and testing sets are disjoint sets having no common elements.

Once the desired training set 410 and testing set 412 (and if applicable additional data sets such as the validation set 413), they are fed into the classifier 416.

Generally, the classifier 416 is configured to use the training set 410 which includes a set of inputs and correct outputs (e.g. input product information and output classifications) to analyze and train the model in the classifier 416 to learn over time the model configuration such as the rules in the model and associated hyper parameters. After the model is built, the testing set 412 is used by the classifier 416 to validate that the model can make accurate predictions on the classifications of products. As noted, in some cases, a validation set 413 may also be generated whereby the validation data may inject new data into the model which hasn't been evaluated on the model previously to evaluate how well the trained model performs on the new data. The validation set 413 may further be used to optimize hyper-parameters on the model.

Once trained, tested and in some implementations validated, the generated classifier 416 may be configured to receive new e-commerce related data from the new data set 414 (e.g. images, text, and combinations thereof which may be labelled with product associations or unlabelled) having attributes or features of e-commerce products (e.g. product identifier, product name, product images, product categories, brand name, etc.) and generate one or more associated output classification(s) 418 based on the generated supervised learning model in the classifier 416.

FIG. 7 illustrates an example flowchart of operations 700 which may be performed by the engine 300 for partitioning data used for generating supervised learning models (e.g. the classifier 416), on a computing device, such as the e-commerce platform 100 or on another computing device such as the merchant devices 102 or customer device 150. The operations 700 are further described below with reference to FIGS. 1-6. The computing device for carrying out the operations 700 may comprise a processor configured to communicate with a display to provide a graphical user interface (GUI) where the computing device has a network interface to receive various features of product information (e.g. text, images, and other product information as may be stored in input text database 402, input image database 404 and input product database 406), data partitioning preferences and wherein instructions (stored in a non-transient storage device), when executed by the processor, configure the computing device to perform operations such as operations 700. The data partitioning preferences used by the engine 300 may include defined information such as the number of desired groups, types of such groups (e.g. testing or validation or training, etc.) and parameters of desired groups of data for the model. An example includes defining that two groups of data are needed for a testing dataset and a training dataset. In general, the description below will refer to the method of operations 700 being carried out by a processor. In at least some aspects of the operation 700, the supervised learning model is a classification model including a neural network for classifying the e-commerce products containing at least image content (and in some aspects, text) into a set of labelled categories of products by training the classification model based on the training dataset and testing a performance of the classification model using the testing dataset.

In operation 702, the processor receives an input dataset for e-commerce products, each sample in the dataset containing a set of attributes and associated values for each product, the attributes containing at least an image for each product. Notably, the data set received is for building the supervised machine learning model (e.g. the classifier 416), and includes features or attributes of a number of e-commerce products. The features/attributes may be in the form of images and/or text characterizing each e-commerce product. The attributes may include but are not limited to: product description, product identification, brand identification, financial statistics related to the products, product images, and customer images. The dataset received may include at least some data (e.g. product images, images of product packaging, images of use of product in environment, images of other similar products, images of various views, etc.) in the form of images. The input dataset (which may be stored in one or more of the input text database 402, input image database 404, and input product database 406) may include attribute data that is unlabelled or labelled data (or otherwise associated with) one or more e-commerce products such mapping may be stored in the input product database (e.g. including images of a product and product identification).

Following operation 702, operation 704 includes representing each said sample in the dataset as a node on a graph (e.g. the connectivity data graph 409) with the associated values for that sample and associated with a particular product from the e-commerce products to provide a graph of nodes for the dataset. An example of such a connected graph of nodes is shown in FIGS. 5A and 5B. In one implementation, the processor is configured for representing each sample in the data set using a graph mining algorithm whereby each node is plotted on a graph and corresponds to a particular e-commerce product's attributes represented as text and/or image (e.g. product price, product ID, product brand, product images showing various views of one product and/or related products, images relating to product vendor, etc.) to be used as the basis for splitting the sample dataset.

Following operation 704, operation 706 includes measuring a relative similarity distance between each set of two nodes on the graph of nodes based on comparing at least image values for the attributes. Thus, in at least some aspects, at least images in the nodes are compared to one another in order to determine a similarity distance. In one implementation, this operation includes for each pair of nodes, performing a comparison of the attributes (e.g. images and/or text) to other nodes to determine the relative similarity distance (e.g. Euclidean distance) between them. For example, the image attribute values of a first node to the image attribute values of a second node determine how similar the nodes are to one another based on a distance vector calculated.

In one aspect, measuring the relative similarity distance between two nodes in operation 706 may include representing each node as a multi-dimensional vector, at least one dimension representing each of the associated attributes containing text and image samples. Thus, a dimension may include, text values for an attribute of a product, image values for an attribute of a product, or a combination of image and text values for an attribute of a product. This multi-dimensional vector allows distance measurements to be performed between two nodes, e.g. comparing the text values in a first dimension of a first node to the text values in a first dimension of a second node to calculate a first distance measurement and comparing the image values in the second dimension of a first node to the image values in the second dimension of a second node to calculate a second distance measurement and averaging the first and second distance measurement to provide the relative similarity distance across multiple dimensions of attributes.

Optionally at operation 706, measuring the relative similarity distance between two nodes each containing associated image data for the attributes, further comprises: performing a hashing conversion to each image data in the respective nodes to generate a hash value for each node and calculating a Hamming distance (or other distance measurements as envisaged) between the hash values of the images as the relative similarity distance, the image data for two nodes being considered similar (or sufficiently similar such as to have a high similarity score that exceeds a defined value) if the relative similarity distance provided by the Hamming distance or other distance measurement is below a defined threshold.

Optionally at operation 706, measuring the relative similarity distance between two nodes each containing associated text data for the attributes (e.g. product identification information, text description of the product), further comprises converting the text data to a vector including a frequency of each word (e.g. frequency of words in a given passage corresponding to product description) and calculating a distance between vectors for the text data, the text data for two nodes being considered similar if the relative similarity distance is below a defined threshold and thus resulting in a high similarity score (above a defined value for the score). Other methods for converting the text into vector representations for distance calculations may be envisaged (e.g. determining a context or intent of the text based on a defined set of intents). In yet other aspects, the text may be compared directly from one node to another node after having been categorized in a relevant category (e.g. brand name).

In one aspect of operation 706, the similarity distance is calculated between the vectors of the feature values for two nodes. Such distance may be determined, for example, using one or more of: a Euclidean distance, Minkowski distance, Manhattan distance, Hamming distance, and Cosine distance.

Following operation 706, at operation 708, determining for each set of two nodes whether they are related if the relative similarity distance between them is below a defined threshold, and if related, generating an edge between them to provide connected nodes on the graph. Put another way, the processor is configured to determine whether two nodes in the graph are similar to one another based on the distance calculated at operation 706 being below a defined threshold. If two nodes are considered sufficiently similar, the processor (e.g. the data partitioning model 408 which generates the connectivity data graph 409) is configured to draw an edge between them to show that there is an overlap of information between them. The similarity distance may provide a numerical measure of how different or similar two data objects represented as nodes are to one another and may range from 0 (objects are alike) to infinity (objects are different). Therefore, the smaller the relative similarity distance is between two nodes, the larger the similarity score for them.

Following operation 708, at operation 710, the processor is configured for assigning each node on the graph of nodes to a first group or a second group, a particular node assigned to the first group if connected to at least one other node in the first group and assigned to the second group if no connection to another node in the first group to generate two disjoint groups such that the nodes grouped together have a shortest relative similarity distance with each other. An example of grouping connected nodes is shown in FIGS. 5A and 5B. The operation 710 may thus include segregating the input data points (e.g. including any combination of text and image attributes for products) for the input data set into one of two defined groups (a training data set or testing data set) based on co-grouping of data points that are connected or linked to each other based on having similarities in the feature(s). In some aspects as shown in FIG. 4, the engine 300 may be configured to generate three or more data groupings, e.g. for a training set 410, a testing set 412 and a validation set 413 and thus, the clusters of connected node components are assigned accordingly.

Optionally, in at least some aspects of operation 710, in order to assign each node to a first group or a second group of connected components, the processor may be configured to generate the connectivity data graph 409 in a number of iterations since initially, the number of groupings exceeds a desired number of groups for the data sets to build the classifier 416. Thus, depending on parameters defined for the data sets and the number of data sets needed for building the machine learning model in the classifier 416, e.g. training data set and testing data set, an additional step may occur of grouping two sets of internally connected node components but externally disconnected to each other (e.g. see FIG. 5A the first group 501 and the second group 502 are grouped together to form the first training set 504). In one aspect, the consolidation of groups may be performed because it is defined that the first training set 504 or first testing set 505 has a certain size. In other aspects, such additional grouping may be performed by determining that a centroid for the first group 501 is closest in distance to the centroid for the second group 502 as compared to the centroid in the third group 503.

In operation 712 following operation 710, it is defined that the first group is used as a training dataset (e.g. training set 410) to train a supervised learning model (e.g. classifier 416) and the second group is used as a testing set (e.g. testing set 412) to test the model, the model for subsequent use in predicting a classification such as output classifications 418 for a new e-commerce product as received in the new data set 414 based on at least an image input in the new data set 414.

Optionally, in some aspects, the operations 700 may include the processor configured for calculating the similarity distance by grouping connected nodes extending between more than two nodes to form a grouped connection whereby the relative similarity distance being calculated between the grouped connection and at least one of: other nodes in the graph of nodes. That is, in some cases if new data samples are received at the engine 300 into the data partitioning model 408, the nodes corresponding to such new data samples may be compared to the existing grouped connection of nodes (e.g. first group 501 previously grouped may be compared to each newly added node). Alternately, if the newly added nodes have formed a set of connected components (e.g., the second group 502), the distance measurement may be computed between the previously grouped connection (e.g. the first group 501) and the other grouped connection of nodes (e.g. the second group 502) to determine the distance.

Optionally, in some aspects of the operation 700, the processor may be configured for identifying connected nodes in operation 708 by identifying an arbitrary first node in the connectivity data graph 409 initially generated at operation 704 and iteratively determining whether the neighbour nodes located closest to it are connected to the first node (e.g. by calculating the similarity distance) and if connected, drawing or generating an edge therebetween. The processor may be configured to repeat this process for remaining nodes in the graph to determine connectivity with other nodes, but may be stopped depending on the maximum data set size defined for the first or the second group (e.g. training set 410 or the testing set 412). That is, a stopping point may be once the max number of nodes for the first group have been reached then no further nodes need to be examined for similarity.

In one or more examples, the functions described may be implemented in hardware, software, firmware, or combinations thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including such media as may facilitate transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

Various embodiments have been described. These and other embodiments are within the scope of the following claims.

The invention claimed is:

1. A computer-implemented method for partitioning data used for generating supervised learning models, the method comprising:
    receiving an input dataset for e-commerce products, each sample in the dataset containing a set of attributes and associated values for each product, the attributes containing at least an image for each product;
    representing each said sample in the dataset as a node on a graph with the associated values for that sample and associated with a particular product from the e-commerce products to provide a graph of nodes for the dataset;
    measuring a relative similarity distance between each set of two nodes on the graph of nodes based on comparing at least image values for the attributes;
    determining for each set of two nodes whether they are related if the relative similarity distance between them is below a defined threshold, and if related, generating an edge between them to provide connected nodes on the graph;
    assigning each node on the graph of nodes to a first group or a second group, a particular node assigned to the first group if connected to at least one other node in the first group and assigned to the second group if no connection to another node in the first group to generate two disjoint groups such that the nodes grouped together have a shortest relative similarity distance with each other; and
    wherein the first group is used as a training dataset to train a supervised learning model and the second group is used as a testing set to test the model, the model for subsequent use in predicting a classification of a new e-commerce product based on at least an image input.

2. The method of claim 1, comprising grouping connected nodes extending between more than two nodes to form a grouped connection thereby the relative similarity distance being calculated between the grouped connection and at least one of: other nodes in the graph of nodes, and other grouped connection of nodes connected together by edges.

3. The method of claim 1, wherein the nodes once grouped into the grouped connection are related to one another at least by way of characterizing a same e-commerce product; and, measuring the relative similarity distance further comprising measuring the relative similarity distance between a centroid of each two grouped connections to determine whether to group into the first or the second group.

4. The method of claim 1, wherein the attributes comprise image and text converted to vector values describing the e-commerce products, the attributes comprising: product description, product identification, brand identification, financial statistics related to the products, product images, and customer images.

5. The method of claim 4, wherein measuring the relative similarity distance between two nodes comprises representing each node as a multi-dimensional vector, at least one dimension representing each of the associated attributes containing text and image samples.

6. The method of claim 5, wherein the similarity distance is calculated between the multi-dimensional vectors for two nodes using one of: a Euclidean distance, Minkowski distance, Manhattan distance, Hamming distance, and Cosine distance.

7. The method of claim 1, further comprising a third group of nodes comprising connected nodes having edges connecting them, the third group of nodes having samples selected from the dataset, the third group of nodes being disjoint from both the first and the second group and used as a validation set to validate the classification model.

8. The method of claim 1, wherein the supervised learning model is a classification model comprising a neural network for classifying the e-commerce products containing image and text into a set of labelled categories of products by training the classification model based on the training dataset and testing a performance of the classification model using the testing dataset.

9. The method of claim 1, wherein measuring the relative similarity distance between two nodes each containing associated image data for the attributes, further comprises: performing a hashing conversion to each image data to generate a hash value for each node and calculating a Hamming distance between the hash values as the relative similarity distance, the image data for two nodes being considered similar if the relative similarity distance is below a defined threshold.

10. The method of claim 1, wherein measuring the relative similarity distance between two nodes each containing associated text data for the attributes, further comprises converting the text data to a vector including a frequency of each word and calculating a distance between vectors for the text data, the text data for two nodes being considered similar if the relative similarity distance is below a defined threshold.

11. A non-transitory computer readable medium having instructions tangibly stored thereon, wherein the instructions, when executed cause a system to: receive an input dataset for e-commerce products, each sample in the dataset containing a set of attributes and associated values for each product, the attributes containing at least an image for each product; represent each said sample in the dataset as a node on a graph with the associated values for that sample and associated with a particular product from the e-commerce products to provide a graph of nodes for the dataset; measure a relative similarity distance between each set of two nodes on the graph of nodes based on comparing at least image values for the attributes; determine for each set of two nodes whether they are related if the relative similarity distance between them is below a defined threshold, and if related, generate an edge between them to provide connected nodes on the graph; assign each node on the graph of nodes to a first group or a second group, a particular node assigned to the first group if connected to at least one other node in the first group and assigned to the second group if no connection to another node in the first group to generate two disjoint groups such that the nodes grouped together have a shortest relative similarity distance with each other; and, wherein the first group is used as a training dataset to train a supervised learning model and the second group is used as a testing set to test the model, the model for subsequent use in predicting a classification of a new e-commerce product based on at least an image input.

12. A computer system for partitioning data used for generating supervised learning models, the computer system comprising:
 a processor in communication with a storage, the processor configured to execute instructions stored on the storage to cause the system to:
 receive an input dataset for e-commerce products, each sample in the dataset containing a set of attributes and associated values for each product, the attributes containing at least an image for each product;
 represent each said sample in the dataset as a node on a graph with the associated values for that sample and associated with a particular product from the e-commerce products to provide a graph of nodes for the dataset;
 measure a relative similarity distance between each set of two nodes on the graph of nodes based on comparing at least image values for the attributes;
 determine for each set of two nodes whether they are related if the relative similarity distance between them is below a defined threshold, and if related, generate an edge between them to provide connected nodes on the graph;
 assign each node on the graph of nodes to a first group or a second group, a particular node assigned to the first group if connected to at least one other node in the first group and assigned to the second group if no connection to another node in the first group to generate two disjoint groups such that the nodes grouped together have a shortest relative similarity distance with each other; and,
 wherein the first group is used as a training dataset to train a supervised learning model and the second group is used as a testing set to test the model, the model for subsequent use in predicting a classification of a new e-commerce product based on at least an image input.

13. The system of claim 12, wherein the processor is configured to execute further instructions comprising grouping connected nodes extending between more than two nodes to form a grouped connection thereby the relative similarity distance being calculated between the grouped connection and at least one of: other nodes in the graph of nodes, and other grouped connection of nodes connected together by edges.

14. The system of claim 12, wherein the nodes once grouped into the grouped connection are related to one another at least by way of characterizing a same e-commerce product; and, measuring the relative similarity distance further comprising measuring the relative similarity distance between a centroid of each two grouped connections to determine whether to group into the first or the second group.

15. The system of claim 12, wherein the attributes comprise image and text converted to vector values describing the e-commerce products, the attributes comprising: product description, product identification, brand identification, financial statistics related to the products, product images, and customer images.

16. The system of claim 15, wherein measuring the relative similarity distance between two nodes comprises representing each node as a multi-dimensional vector, at least one dimension representing each of the associated attributes containing text and image samples.

17. The system of claim 16, wherein the similarity distance is calculated between the multi-dimensional vectors for two nodes using one of: a Euclidean distance, Minkowski distance, Manhattan distance, Hamming distance, and Cosine distance.

18. The system of claim 12, further comprising a third group of nodes comprising connected nodes having edges connecting them, the third group of nodes having samples selected from the dataset, the third group of nodes being disjoint from both the first and the second group and used as a validation set to validate the classification model.

19. The system of claim 12, wherein the supervised learning model is a classification model comprising a neural network for classifying the e-commerce products containing image and text into a set of labelled categories of products by training the classification model based on the training dataset and testing a performance of the classification model using the testing dataset.

20. The system of claim 12, wherein measuring the relative similarity distance between two nodes each containing associated image data for the attributes, further comprises: performing a hashing conversion to each image data to generate a hash value for each node and calculating a Hamming distance between the hash values as the relative similarity distance, the image data for two nodes being considered similar if the relative similarity distance is below a defined threshold.

* * * * *